United States Patent
Adams et al.

(10) Patent No.: US 10,191,761 B2
(45) Date of Patent: *Jan. 29, 2019

(54) ADAPTIVE DYNAMIC SELECTION AND APPLICATION OF MULTIPLE VIRTUALIZATION TECHNIQUES

(71) Applicant: VMware, Inc., Palo Alto, CA (US)

(72) Inventors: Keith M. Adams, Palo Alto, CA (US); Jeffrey W. Sheldon, Mountain View, CA (US); Vyacheslav V. Malyugin, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/369,470

(22) Filed: Dec. 5, 2016

(65) Prior Publication Data

US 2017/0083360 A1 Mar. 23, 2017

Related U.S. Application Data

(63) Continuation of application No. 15/069,366, filed on Mar. 14, 2016, now Pat. No. 9,513,954, which is a
(Continued)

(51) Int. Cl.
*G06F 9/445* (2018.01)
*G06F 9/455* (2018.01)

(52) U.S. Cl.
CPC ...... *G06F 9/45558* (2013.01); *G06F 9/45533* (2013.01); *G06F 2009/45566* (2013.01);
(Continued)

(58) Field of Classification Search
None
See application file for complete search history.

(56) References Cited

U.S. PATENT DOCUMENTS 6,151,618 A 11/2000 Wahbe et al.
6,442,681 B1 8/2002 Ryan et al.
(Continued)

FOREIGN PATENT DOCUMENTS

EP 1524596 A2 4/2005
WO 2008144566 A1 11/2008

OTHER PUBLICATIONS

Notification of Transmittal of International Search Report and the Written Opinion of the International Searching Authority, or the Declaration, dated Sep. 2, 2008, Patent Cooperation Treaty "PCT" Alexandria Virginia.
(Continued)

*Primary Examiner* — Gregory A Kessler
(74) *Attorney, Agent, or Firm* — Patterson + Sheridan LLP

(57) ABSTRACT

Autonomous selection between multiple virtualization techniques implemented in a virtualization layer of a virtualized computer system. The virtual machine monitor implements multiple virtualization support processors that each provide for the comprehensive handling of potential virtualization exceptions. A virtual machine monitor resident virtualization selection control is operable to select between use of first and second virtualization support processors dependent on identifying a predetermined pattern of temporally local privilege dependent instructions within a portion of an instruction stream as encountered in the execution of a guest operating system.

20 Claims, 8 Drawing Sheets

Related U.S. Application Data continuation of application No. 14/052,931, filed on Oct. 14, 2013, now Pat. No. 9,286,095, which is a continuation of application No. 12/152,517, filed on May 14, 2008, now Pat. No. 8,561,061.

(60) Provisional application No. 60/917,732, filed on May 14, 2007.

(52) U.S. Cl.
CPC .............. *G06F 2009/45583* (2013.01); *G06F 2009/45591* (2013.01)

(56) References Cited

U.S. PATENT DOCUMENTS

| | | | |
|---|---|---|---|
| 7,500,244 | B2 | 3/2009 | Galal et al. |
| 7,711,719 | B1 | 5/2010 | Waldin et al. |
| 2004/0025158 | A1* | 2/2004 | Traut .................. G06F 11/3466 718/1 |
| 2006/0005199 | A1 | 1/2006 | Galal et al. |
| 2006/0010440 | A1 | 1/2006 | Anderson et al. |
| 2007/0271560 | A1* | 11/2007 | Wahlert .................... G06F 8/61 718/1 |
| 2007/0283125 | A1 | 12/2007 | Manczak et al. |
| 2008/0288940 | A1 | 11/2008 | Adams et al. |

OTHER PUBLICATIONS

Adams K. et al., "AComparison of Software and Hardware Techniques for x86 Virtualization", Computer Archtecture News ACM USA, vol. 34. No. 5., Dec. 2006 pp. 2-13.

\* cited by examiner

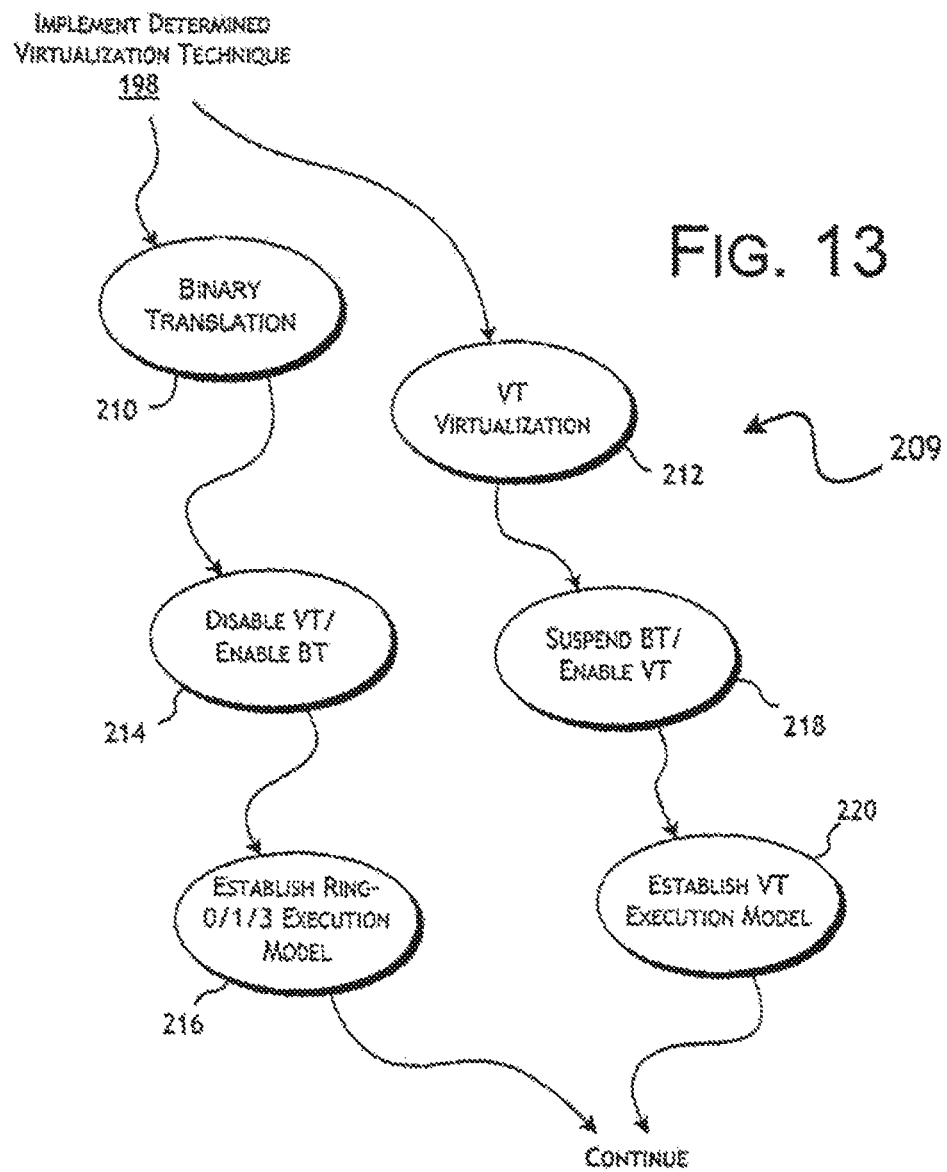

ADAPTIVE DYNAMIC SELECTION AND APPLICATION OF MULTIPLE VIRTUALIZATION TECHNIQUES

CROSS-REFERENCE TO RELATED APPLICATIONS

This application is a continuation of Ser. No. 15/069,366 filed Mar. 14, 2016 which is a continuation of Ser. No. 14/052,931, filed Oct. 14, 2013, U.S. Pat. No. 9,286,095, issued Mar. 15, 2016, which is a continuation of Ser. No. 12/152,517 filed on May 14, 2008, U.S. Pat. No. 8,561,061, issued Oct. 15, 2013, which claims the benefit of U.S. Provisional Application No. 60/917,732, filed May 14, 2007, which provisional application is incorporated herein by reference in its entirety.

FIELD OF THE INVENTION

One or more embodiments of the present invention relate to computer system virtualization and, in particular, to a systematic, performance-based method for dynamically selecting and applying different virtualization techniques to enhance application and guest operating system execution performance within a virtualization environment.

BACKGROUND

Various forms of computer system virtualization have been used with varying degrees of success to improve utilization of capabilities of physical resources present and available in a given computing system platform. In general terms, virtualization enables functionally parallel execution of multiple computer system environments on a given hardware platform. These computer system environments embed guest operating systems and, by the virtualization, can represent, to varying degrees, computing platforms dissimilar from the underlying physical system platform.

Virtualization systems are typically implemented using a virtual machine monitor (VMM), also frequently referred to as a hypervisor, that provides support and coordinated control over one or more co-executed virtual machines (VMs). Each virtual machine represents a discrete execution environment that encapsulates a virtual platform, guest operating system, and address space for the execution of application programs. Over the years, various specific approaches for implementing virtual machine monitors have been proposed and implemented.

Conventional approaches to virtualization that can, at least theoretically, implement a virtual machine monitor include trap-and-emulate, para-virtualization, and binary translation. Trap-and-emulate virtualization relies on a platform central processing unit (CPU) to implement a privilege model that will raise an exception whenever a privilege dependent instruction is executed in an unprivileged context. Privilege dependent instructions can be generally classified as those instructions that directly modify a security state of the executing CPU, as those instructions whose execution behavior varies dependent on the privilege level of the execution context, and as those instructions that can be used to reveal the security state of the CPU to enable conditional program execution. In a so-called classically virtualizable computer architecture, all privilege dependent instructions will raise an exception when executed in an unprivileged context.

A classical trap-and-emulate virtualization system provides for direct execution of a guest operating system within a virtual machine, though at an unprivileged security level. In this system, the virtual machine monitor is executed at a privileged level, and privilege exceptions raised in executing the guest operating system are trapped by the virtual machine monitor. The trapped instruction and related execution context are then evaluated by the virtual machine monitor as needed to enable emulation of the intended guest operating system function that invoked the trapped exception.

In greater detail, conventional operating systems are nominally implemented to make use of a supervisor/user privilege system. The operating system kernel and certain essential services execute with supervisory rights, while non-essential operating system and user applications execute with reduced user rights. In a typical x86-based architecture, ring-0, 1, 2, and 3 privilege levels are supported by hardware controls. Operating systems conventionally execute at the ring-0 privilege level, while user applications commonly execute at ring-3. Some specialized user-level applications can be run at ring-1 and, for reasons not relevant here, ring-2 is rarely if ever used. The distinction between ring-0 and the higher, less privileged rings is nominally enforced by hardware architecture security controls by raising privilege exceptions if certain privilege dependent instructions are executed outside of ring-0. Conventionally, a privilege exception is treated as a non-reentrant event, since a user level program that executes a privileged instruction is typically terminated as a security precaution. Still, x86-based architectures do support the ability to restart execution of an instruction that invokes a privilege trap exception. Generation of a privilege exception results in a context switch to the ring-0 privilege level where the exception is handled by an associated exception handler.

The context switch and subsequent emulation operation of the virtual machine monitor imposes a performance overhead in the virtualized execution of guest operating systems. Optimizing this overhead performance is thus a concern in all virtual machine implementations. Unfortunately, the context switch and emulation overhead is not the only or even principal problem with trap-and-emulate virtualization systems. Rather, the principal problem is that the conventionally prevalent x86 architectural model is not a classically virtualizable architecture. While many privilege dependent instructions will appropriately generate privilege exceptions, other standard x86 instructions cannot be made to generate privilege exceptions for activities that should be confined to ring-0 execution. For example, various x86 instructions can be used to modify the contents of certain x86 CPU-internal registers that contain control bits modifiable only in a ring-0 execution context. Other bits in these registers may be validly written outside of ring-0 execution. Any x86 instruction that attempts to modify the ring-0 constrained control bits outside of ring-0 execution will not only fail to generate a privilege exception, but the attempted modification will be silently ignored. Further, where the modification is attempted specifically by a deprivileged guest operating system kernel, the intended kernel behavior will not be realized. Consequently, the execution behavior of these instructions differs based on the privilege level of execution.

Another problem can arise for guest operating system modules intended to execute in both privileged and non-privileged circumstances. Given that the guest operating system is executed in user, rather than supervisory mode, any run-time differentiating test for privilege-level status implemented by such a module will always identify user mode execution. The inability to execute privileged operations as intended in the design and implementation of the module will compromise the function of the module and guest operating system as a whole.

Since the conventional x86 architecture does not raise exceptions on execution of all privilege dependent instructions, the x86 architecture is not classically virtualizable. A further discussion of these problems can be found in the article, Robin, J. S. & Irvine, C. E., "Analysis of the Intel Pentium's Ability to Support a Secure Virtual Machine Monitor," Proceedings of the 9$^{th}$ USENIX Security Symposium, Denver, Colo., August 2000.

Para-virtualization takes a different approach to dealing with the existence of privilege dependent instructions in non-classically virtualizable architectures. As with trap-and-emulate virtualization, para-virtualization systems implement a virtual machine monitor to provide supervisory control over the co-execution of the virtual machines. While the guest operating systems similarly execute deprivileged on the underlying platform, para-virtualization requires the guest operating systems to be directly aware of, and invoke, the virtual machine monitor to handle circumstances involving privilege dependent instructions. Since conventional operating systems are implemented without provision for interacting with a virtual machine monitor, standard para-virtualization implementations require the guest operating systems to be specifically modified to support virtualization. That is, typically source-code level modification of a guest operating system is required at every point where execution of a privilege dependent instruction in a deprivileged context could result in an undesirable behavior.

The para-virtualization virtual machine monitor typically contains library routines, accessible from the guest operating systems, that appropriately emulate necessary guest operating system privileged functions. A current, conventional implementation of a para-virtualization virtual machine monitor, known as Xen 3.0, is available from XenSource, Inc., based in Palo Alto, Calif. A drawback to para-virtualization is a requirement to modify the guest operating system core kernel to support virtual machine monitor interactions. Conventionally, each different type and version of each guest operating system supported must be modified. In many instances, access to the required components of the operating system is not available. Given the core kernel location of the modifications required, a significant testing burden is incurred to ensure that kernel operations are not unintentionally affected directly or indirectly in the ability to support consistent behavioral execution of higher operating system layers and applications.

Binary translation-based virtualization systems, like trap-and-emulate and para-virtualization systems, typically implement a virtual machine monitor to functionally manage and coordinate execution of guest operating systems within virtual machines. The virtual machine monitor executes in a privileged context and manages the execution of the guest operating systems. As described in, for example, U.S. Pat. No. 6,397,242, issued to Devine et al., and assigned to the assignee of the present application, the virtual machine monitor performs a run-time analysis of the instruction execution stream to identify occurrences of privilege dependent instructions that, if executed unaltered, could result in undesirable system behavior. The run-time analysis is performed by a binary-to-binary translator that emits a functionally equivalent instruction stream that incorporates emulations of the privilege dependent instructions. Depending on the nature and use of a privilege dependent instruction, the binary translation results produces some combination of rewritten instructions and call-outs to library routines appropriate to emulate the function of the guest operating system intended to be performed by the privilege dependent instruction segment. The resulting translated instruction stream is preferably cached, and thereafter executed in replacement of the corresponding portion of the guest operating system.

Although the initial processing and binary translation of an instruction stream imposes a performance burden, subsequent execution of the translated instruction stream from the translation cache achieves near native performance. Given that relatively small portions of modern operating systems are predominantly and repeatedly executed, the overall performance gains realizable using binary translation-based virtualization is substantial. Binary translation-based virtualization systems thus realize the benefit of supporting non-classically virtualizable architectures without requiring the source-level guest operating system modifications of para-virtualization and without the ongoing performance burden of exception handling overhead every time a privilege dependent instruction is executed, as incurred under purely trap-and-emulate virtualization.

The existence of privilege dependent instructions in non-classically virtualizable architectures, such as the x86 architecture, has been long recognized. Only recently, however, a number of hardware-based extensions of the x86 architecture have been proposed and, to varying degrees, implemented to support partitioning virtualization. In particular, Intel Corporation has implemented a virtualization technology, or VT, extension that provides hardware-based support for partitioning virtualization in an otherwise non-classically virtualizable architecture. Other vendors, such as Advanced Micro Devices, Inc., have introduced similar extensions in their microprocessor designs. Given the functional similarity, for purposes of discussing the present invention, all of the hardware-based virtualization extensions can be generically referred to as VT extensions.

In summary, VT introduces a privilege overlay system defining two privilege classes. Relative to the conventional x86 privilege model, a new VMX non-root class, functionally containing a standard x86 ring-0, 1, 2, 3 privilege model, has been added. The conventional x86 privilege model is identified as the VMX root class. In use, a virtual machine monitor implementing a VT trap handler will execute in the VMX root ring-0. By executing guest operating systems in the VMX non-root ring-0, many problems with privilege dependent instructions are resolved; the guest operating systems run in their intended privileged execution mode. Remaining virtualization issues, specifically those arising from the conventionally non-classically virtualizable nature of the x86 architecture, are handled by a controlled deprivilegization of the VMX non-root ring-0 relative to the VMX root ring-0. That is, VT implements VM exit and VM entry operations that encapsulate transitions between the VMX non-root and root privilege states to add exception handling for those privilege dependent instructions and events that do not conventionally raise privilege exceptions. The execution of these non-classically virtualizable instructions and occurrence of certain operating conditions, particularly related to memory paging, interrupt handling and programmed I/O operations, will, either automatically, or as determined by VT-defined control vectors, force a VM exit transition. This allows a VT trap handler implemented within the virtual machine monitor to handle these specific conditions consistently with respect to the parallel array of virtual machines, and thereby maintain overall operational integrity.

Although developed as a more direct approach to supporting partitioning virtualization, and substantially simplifying the implementation of virtual machine monitors, there are inherent limitations to the use of VT and other, similar, hardware-based virtualization support techniques. In particular, the fundamental operation of VT converts many of the privilege dependent instructions into the equivalent of, if not actual, heavy-weight context switches. That is, while essentially implemented in hardware, the VM exit and VM entry transitions require fairly extensive amounts of state information to be preserved and restored from virtual machine control structures on both VM exit and VM entry transitions. The significant processing burden of VM exit and VM entry transitions can be particularly problematic where privilege dependent instructions occur in performance sensitive execution flows within typical guest operating systems. For example, several privilege dependent instructions are characteristically invoked in the management of page tables. In execution of conventional operating system kernels, page table manipulation is rather frequently performed, given the conventional presumption that performance cost is negligible and optimizing memory access is particularly desirable. A VT-type hardware-based virtualization support system as implemented in conventional virtual machine monitors will typically impose a VM exit and VM entry transition on these page table modifications. The overall result is that, for operating systems that frequently invoke privilege dependent instructions, VT-type systems will incur virtualization overheads that are not only significant, but noticeable in practical use.

In addition, a substantial processing burden is imposed by the virtual machine monitor being required to evaluate, for purposes of emulation, the intended operation of the privilege dependent instruction that initiates each VM exit. Although a VM exit transition captures significant state information as part of the hardware implemented VM exit transition, the virtual machine monitor resident VM exit handler must determine anew the intended operation and execution context of the privilege dependent instruction. Typically, the virtual machine monitor operates to decode the privilege dependent instruction and further analyze potentially disparate aspects of the execution context of the guest operating system to correctly characterize and implement an emulated execution of a privilege dependent instruction. Since this decode and analysis is performed following from each VM exit transition, the VT analysis and emulation of trapped privilege dependent instructions is also a substantial source of virtualization overhead.

VT-type hardware-based virtualization does, however, provide significant benefits in certain areas relative to para-virtualization and binary translation virtualization techniques. Relative to para-virtualization, VT virtualization enables execution of unmodified guest operating systems. In comparison to binary translation virtualization, VT virtualization does not impose initial execution overhead, and allows system calls by application programs to the guest operating systems to be executed without intervention by the virtual machine monitor. Also, since VT virtualization does not require a translation cache, a VT virtual machine monitor will require less memory.

SUMMARY OF THE INVENTION

One or more embodiments of the present invention provide an adaptive autonomous system of dynamically optimizing realized execution performance of virtual machines. In accordance with one or more such embodiments, this is achieved by providing for autonomous selection between multiple virtualization techniques implemented in a virtual machine monitor to optimize the execution performance of a virtual machine. The virtual machine monitor implements multiple virtualization support processors that each provide for comprehensive handling of potential virtualization exceptions. For example, a virtual machine monitor resident virtualization selection control is operable to select between use of first and second virtualization support processors dependent on identifying a predetermined pattern of temporally local privilege dependent instructions within a portion of an instruction stream as encountered in the execution of a guest operating system.

Advantageously, the execution performance of individual virtual machines, whether executed alone or concurrently with other virtual machines on a common hardware platform, is individually optimized. In addition, virtual machine execution performance is optimized dynamically without requiring the virtual machine monitor to be reloaded or requiring a restart of any virtual machine. In further addition, the virtualization performance analysis and, when determined appropriate, switching between different virtualization techniques is performed entirely within the virtual machine monitor. The collection of performance data and implementation of the virtualization technique switch are transparent to the virtual machine, including its encapsulated guest operating system, executing applications, and users of the virtual machine. In still further addition, any number of different virtualization techniques can be dynamically evaluated and used in accordance with one or more embodiments of the present invention. In particular, multiple different hardware virtualization-based techniques can be supported by a virtual machine monitor without impacting the optimally selected virtualization technique. In still further addition, the virtualization overhead costs associated with different virtualization techniques are determined dynamically, based at least in part on distinct virtualization support operations required of the virtual machine monitor as determined by the actual execution of a guest operating system. The selection of an optimum virtualization technique will therefore depend on the actual operations required of the guest operating system by guest executed applications. As such, this enables selection of an optimal virtualization technique that dynamically reflects the actual and evolving operating conditions of the virtual machine.

BRIEF DESCRIPTION OF THE DRAWINGS

FIG. 13 is a flow diagram illustrating a preferred embodiment of a method for implementing dynamic transition between multiple virtualization techniques in accordance with the present invention.

DETAILED DESCRIPTION

Figure 1:
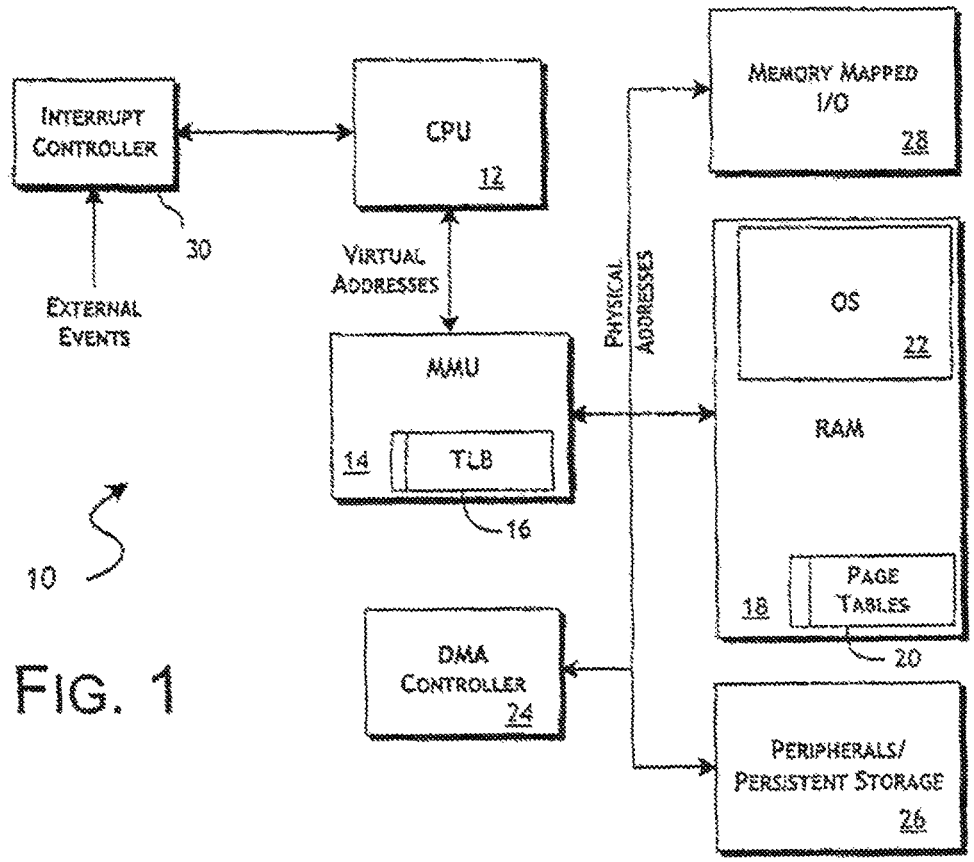
FIG. 1 is a block diagram of major functional components of a general virtual memory system in a computer system platform suitable for implementing one or more embodiments of the present invention.

One or more embodiments of the present invention provide an optimization in selecting virtualization techniques, as implemented in a virtual machine monitor, used in support of execution of a virtual machine. For purposes of simplifying the following detailed description, like reference numerals are used to designate like parts depicted in one or more of the figures.

FIG. 1 is a block diagram of major functional components of a general virtual memory system in computer 10 suitable for implementing one or more embodiments of the present invention. As shown in FIG. 1, computer 10 includes central processor unit (CPU) 12, memory management unit (MMU) 14 containing translation look-aside buffer (TLB) 16, and random access memory (RAM) based main memory 18 providing operation storage of a plurality of page tables 20 and operating system (OS) 22. As further shown in FIG. 1, computer 10 further includes direct memory access (DMA) controller 24, peripheral devices 26, and memory mapped I/O devices 28, wherein DMA controller 24 supports data transfers between main memory 18, peripherals devices 26, including persistent program and data storage devices, and memory mapped I/O devices 28. As still further shown in FIG. 1, interrupt controller 30 provides event notification support to CPU 12. Various physical implementations of computer 10 are considered equivalent for purposes of embodiments of the present invention such as CPU 12 representing multiple processing units, including potentially multi-core processors, and memory management unit 14 implementing other memory allocation algorithms including, for example, non-page table-based schemes. Embodiments of the present invention are not restricted to a particular CPU 12 architecture or instruction set.

CPU 12 functions to execute programs, including OS 22 and associated application programs also resident in the main memory 18, by sequentially processing a stream of instructions and data read from main memory 18. As is conventional, the stream of instructions can and typically will involve the transfer of data between various peripheral devices 26, presented as hardware registers located within a hardware I/O address space and other peripheral devices 28 accessible through a portion of the main memory address space. Interrupt controller 30 provides CPU 12 with notice of external events, typically generated by the various peripheral devices 26, 28, to invoke specialized interrupt handlers by CPU 12 to manage peripheral data transfers.

CPU 12 conventionally implements a virtual address space which may have various different types of organization such as linear or segmented, and utilizes MMU 14 to provide for virtual to physical address translation. For embodiments of the present invention, a segmented virtual address space is preferred. Also, as is conventional, physical memory is managed within the virtual address space as a set of pages. These pages, as loaded within main memory 18, may not be physically continuous, although a logically contiguous relation is typically maintained in the virtual address space. During execution, CPU 12 generates addresses within the virtual address space to read instructions and transfer related data with respect to main memory 18. MMU 14 is responsible for determining whether the corresponding page is actually resident in main memory 18; a page fault exception is generated if the page is not resident. The exception is caught as an interrupt to CPU 12, and a page fault exception handler resident in OS 22 is executed to load the missing page, typically from persistent storage peripheral 26. When the page transfer is complete, execution of the program resumes through re-execution of the instruction that resulted in the page fault. Nominally, MMU 14 will then determine that the page is present and the memory access will complete successfully.

As further described below, MMU 12 conventionally uses page tables 20 to translate virtual addresses into physical addresses. Page tables 20 maintain a mapping, typically implemented using a hierarchical organization, of virtual addresses to physical pages that contain the corresponding physical addresses. In typical virtual memory systems, multiple page table 20 accesses are required to resolve the mapping of a virtual address to a physical address. TLB 16 functions as a cache for page table 20 entries and thereby reduces the number of external memory accesses required by the virtual memory system. If a mapping is not already cached in TLB 16, then MMU 14 must perform a page table walk to retrieve the correct reference to the required physical page. Fortunately, when CPU 12 is executing a computer program, most memory accesses will be to a limited number of pages within main memory 18.

Figure 2A:
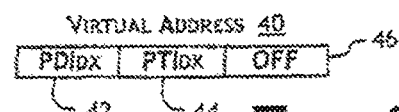
FIGS. 2A and 2B present diagrams illustrating virtual addresses as implemented in x86 architecture systems and the translation of virtual addresses to corresponding physical addresses, using page tables.
Figure 2B:
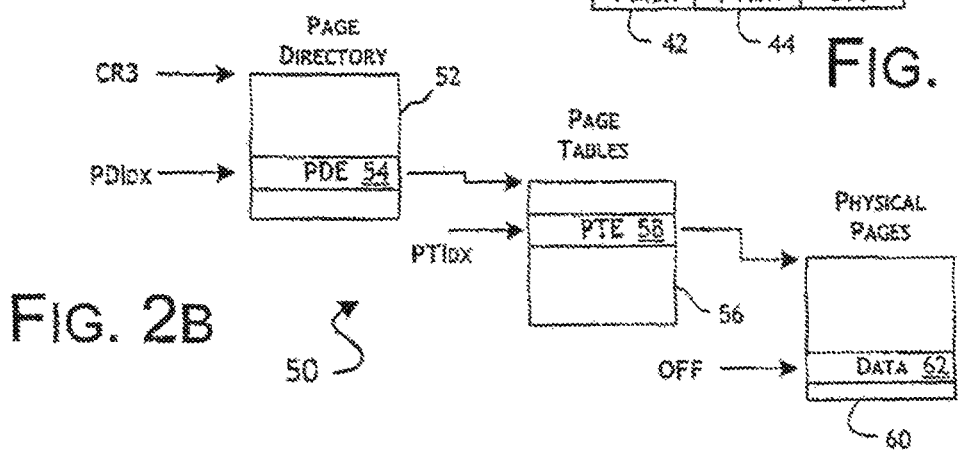

FIGS. 2A and 2B present diagrams illustrating virtual addresses, as implemented in x86 architecture systems, and the translation of virtual addresses to corresponding physical addresses using page tables. In particular, FIGS. 2A and 2B illustrate the translation of 32-bit virtual address 40 to a reference to the physical memory page containing the addressed location. In a typical implementation, virtual address 40 includes 10-bit page directory index (PDIdx) 42, 10-bit page table index (PTIdx) 44, and 12-bit page offset 46. As shown in diagram 50 of FIG. 2B, page directory index 42 defines an offset from a standard x86 control register CR3 into page directory table 52 to locate specific page directory entry (PDE) 54. Page directory entry 54 identifies page table 56 in the set of page tables 20. Page table index 44 is used to select particular page table entry (PTE) 58 that identifies particular physical page 60. Offset 46 locates particular addressed data 62 within selected page table 60.

TLB 16 is used by MMU 14 to cache the results of each distinct virtual address translation, based on the values of page directory index 42 and page table index 44. Thus, before performing an explicit virtual address translation, MMU 14 checks TLB 16 for an entry matching the combined value of page directory index 42 and page table index 44. The result of a match will be the physical address of corresponding memory page 60. A single offset 46 biased access is then required to retrieve the actual data. Conversely, where a match is not found, MMU 14 is required to perform multiple memory accesses required to walk through page tables 20 to locate and evaluate the mapped relation between the page directory and page tables 52, 56. The eventual result of the page table walk, specifically the value of page table entry 58 is stored with corresponding page directory index 42 and page table index 44 in TLB 16.

Figure 3:
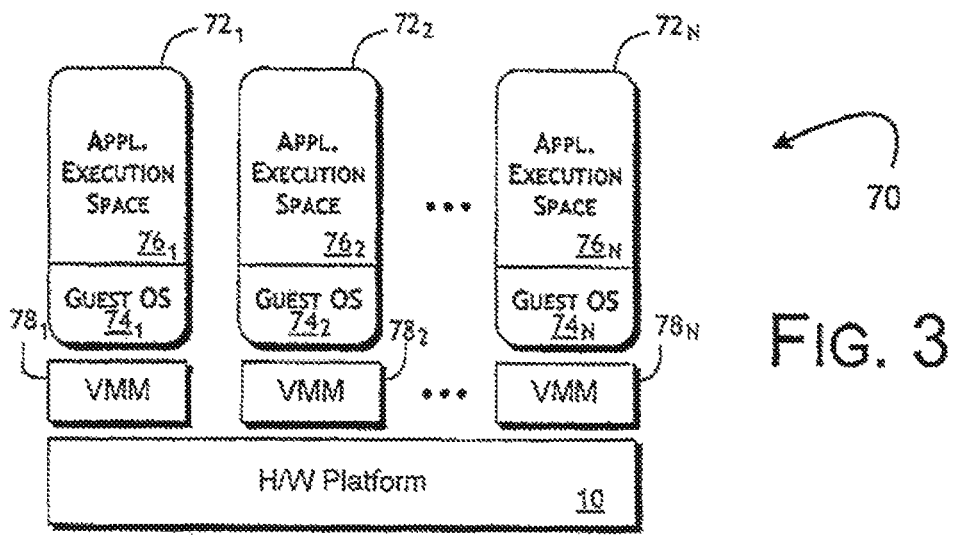
FIG. 3 is a block diagram illustrating a logical arrangement of multiple virtual machines presented for concurrent execution on a computer system platform in accordance with one or more embodiments of the present invention.

FIG. 3 is a block diagram illustrating logical representation 70 of multiple virtual machines present in a virtual address space supported by CPU 12 as supported by computer 10. As shown in FIG. 3, each of virtual machines $72_{1-N}$ encapsulates a guest operating system (guest operating systems $74_{1-N}$, respectively) that, in turn, supports an application execution space (application execution spaces $76_{1-N}$, respectively). For preferred embodiments of the present invention, guest operating systems 74 can be like or different instances of Microsoft® Windows™, Linux™ and Netware™-based operating systems. Other guest operating systems can be equivalently used. In accordance with preferred embodiments of the present invention, each of virtual machines $72_{1-N}$ is managed by a virtual machine monitor (virtual machine monitors $78_{1-N}$, respectively) that internally implements executable components necessary to support multiple distinct virtualization techniques. Virtual machines $72_{1-N}$ and virtual machine monitors $78_{1-N}$ are preferably implemented in a version of an ESX Server product manufactured and distributed by VMware, Inc., Palo Alto, Calif. Use specifically of the ESX Server product is not required in the practice of embodiments of the present invention.

For preferred embodiments of the present invention, each of virtual machine monitors $78_{1-N}$ provide both binary translation and VT-based virtualization support. In alternate embodiments of the present invention, one or more of virtual machine monitors $78_{1-N}$ may implement only or additionally include support for para-virtualization, where corresponding ones of guest operating systems $74_{1-N}$ have been modified to directly utilize para-virtualization support provided by corresponding ones of virtual machine monitors $78_{1-N}$. The provision of support for multiple virtualization techniques within an instance of virtual machine monitors $78_{1-N}$, combined with a component enabling dynamic switching between those virtualization techniques, enables one or more embodiments of the present invention to independently optimize execution of each of virtual machines $72_{1-N}$ appropriate for the particular ones of guest operating system $74_{1-N}$ and specific operational behavior of the application programs executed within the corresponding ones of virtual machines $72_{1-N}$.

Figure 4A:
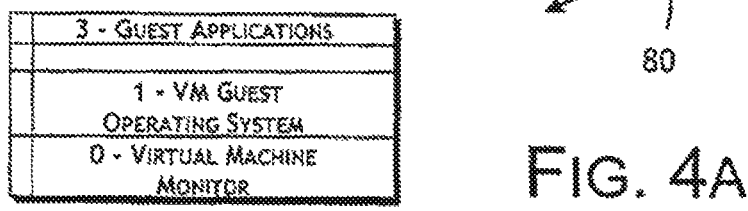
FIGS. 4A and 4B show privilege level models used in accordance with a preferred embodiment of the present invention.

FIG. 4A shows binary translation privilege model 80 used in accordance with a preferred embodiment of the present invention. For x86-based processors, a 2-bit defined privilege protection system defines a level or ring-0 for most-privileged software, and a level or ring-3 for the least privileged. The privilege bits are defined as part of segment register values assigned to memory segments that functionally contain guest operating systems $74_{1-N}$ and virtual machine monitors $78_{1-N}$. As is known, a privilege level determines whether system function oriented instructions will generate a privilege exception when executed by the processor. The privilege level also controls whether certain control registers, including page table pointers and segment registers, are modifiable without generating a privilege exception. Where a conventional operating system executes at a ring-0 privilege level, as shown in FIG. 4A for preferred binary translation privilege model 80, virtual machine monitors $78_{1-N}$ are instead executed at ring-0. Under control of virtual machine monitors $78_{1-N}$, various portions of guest operating systems $74_{1-N}$ are executed at the same or lesser privilege levels. Execution privilege level is determined by virtual machine monitors $78_{1-N}$ based on a specific binary translation applied to a corresponding portion of guest operating system $74_{1-N}$. As further shown in FIG. 4A, application programs executed within application execution spaces $76_{1-N}$ of virtual machines $72_{1-N}$ execute at ring-3.

For preferred embodiments of the present invention, functional segregation of guest operating systems $74_{1-N}$, ring-3 executed applications and virtual machine monitors $78_{1-N}$ within virtual machines $72_{1-N}$ are performed as described in Virtualization System Including a Virtual Machine Monitor For a Computer with a Segmented Architecture, U.S. Pat. No. 6,397,242, issued to Devine et al. and assigned to the assignee of the present invention, which is hereby incorporated by reference. In summary, within individual address spaces allocated to virtual machines $72_{1-N}$, segments containing virtual machine monitors $78_{1-N}$ are assigned to high memory addresses and guest operating system $74_{1-N}$ segments to low memory addresses. Memory space available to individual guest operating systems $74_{1-N}$ is constrained, by truncation of appropriate segmentation control register values held in relation to each of virtual machines $72_{1-N}$, to prevent overlap with the segmentation address space of virtual machine monitors $78_{1-N}$. In accordance with one or more embodiments of the present invention, the assigned privilege level of guest operating systems $74_{1-N}$ are separately modifiable by suitably re-writing privilege control bits associated with the different segments.

To ensure functional segregation of individual guest operating systems $74_{1-N}$ and virtual machine monitors $78_{1-N}$, and further as between virtual machines $72_{1-N}$, virtual machine monitors $78_{1-N}$ manage allocation and use of memory pages by guest operating systems $74_{1-N}$. Normally, each of guest operating systems $74_{1-N}$ would expect to have access to the full virtual address space of CPU 12. To preserve address space integrity, virtual machine monitors $78_{1-N}$ actively constrain guest operating systems $74_{1-N}$ from accessing or allocating memory within virtual machine monitors $78_{1-N}$ or other virtual machines $72_{1-N}$. This is achieved by each of virtual machine monitors $78_{1-N}$ establishing shadow structures that represent various on-CPU registers and in-memory data structures of the respective guest operating systems $74_{1-N}$. These data structures constrain the manner and extent by which guest operating systems $74_{1-N}$ can access the virtual address space of CPU 12. In particular, shadow structures are maintained for guest-level primary data structures involved in segmentation and page table management as performed by guest operating systems $74_{1-N}$.

Figure 5:
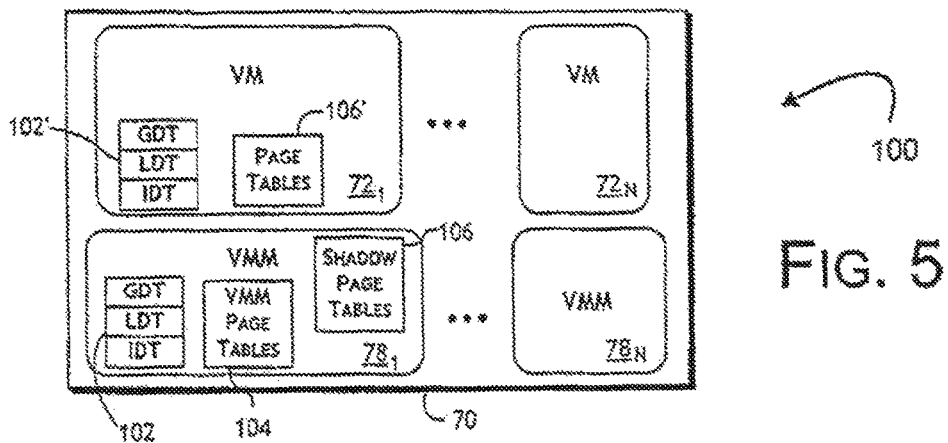
FIG. 5 is a block diagram showing memory space allocation and control functions associated with execution of multiple virtual machines in accordance with one or more embodiments of the present invention.

FIG. 5 is a block diagram showing memory space allocation and control functions associated with execution of multiple virtual machines $72_{1-N}$ in accordance with one or more embodiments of the present invention. As generally indicated in FIG. 5, x86 architecture 100 includes on-CPU registers that store address pointers to global descriptor (GDT), local descriptor (LDT), and interrupt descriptor (IDT) tables 102. A global descriptor table nominally stores segment descriptors that each identifies a memory segment, a corresponding two-bit segment privilege level value, and segment read/write permissions. Accesses, particularly, write accesses by guest operating systems $74_{1-N}$ to the on-CPU descriptor table registers or to global descriptor table (GDT), local descriptor table (LDT), and interrupt descriptor tables (IDT) 102 of guest operating systems $74_{1-N}$ result in a privilege exception. When such an exception is trapped by one of virtual machine monitors $78_{1-N}$, shadowed register or data structure 102' is referenced to enable proper functional emulation of the operation. In currently preferred embodiments, the IDT table is not directly shadowed. Rather, virtual machine monitors $78_{1-N}$ read and transform, as appropriate for each corresponding one of guest operating systems $74_{1-N}$, a logical representation of the contents of the IDT table in response to IDT modification exceptions. As part of the emulation, the creation and subsequent modification of memory segments can be actively monitored by virtual machine monitors $78_{1-N}$ to ensure that memory space integrity is maintained.

As further shown in FIG. 5, x86 architecture 100 also employs page tables 104 to manage virtual to real address translations within the segmented address space. Virtual machine monitors $78_{1-N}$ maintain page tables 104 that define the operating environment of the corresponding virtual machine monitor $78_{1-N}$ instances. Shadow page tables 106 are maintained generally in parallel with guest page tables 106' implemented within a corresponding one of guest operating system $74_{1-N}$. Normal operating system actions to access a memory page identified through page tables 106' are trapped through use of the privilege control system. The trap operation allows virtual machine monitors $78_{1-N}$ to first qualify and, as appropriate, load or otherwise manage availability of an accessed memory page. That is, where a memory page requested by one of guest operating systems $74_{1-N}$ is determined not to be present by a corresponding one of virtual machine monitors $78_{1-N}$ based on shadow page tables 106, the access is qualified and, as appropriate, the corresponding page is loaded by that one of virtual machine monitors $78_{1-N}$. Both shadow and guest page tables 106, 106' are updated. Execution of that one of guest operating systems $74_{1-N}$ is then resumed with the result that the requested page is found. Conversely, where access to the requested page is not appropriate, as determined by virtual machine monitor $78_{1-N}$, a suitable access exception fault is forwarded to the corresponding one of guest operating systems $74_{1-N}$ to handle as appropriate for that one of guest operating systems $74_{1-N}$.

Figure 4B:
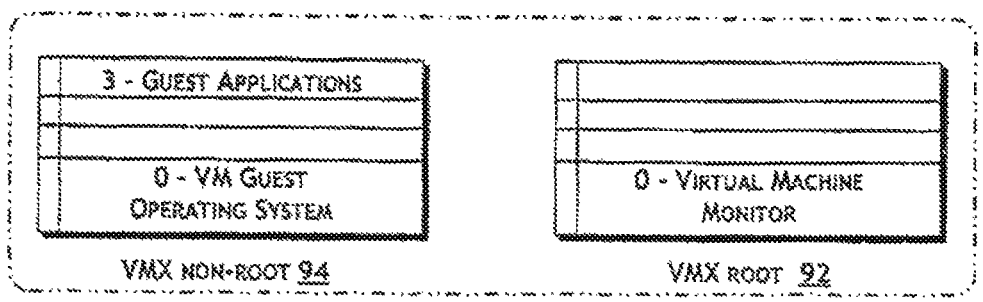

FIG. 4B shows preferred VT privilege model 90 used in accordance with a preferred embodiment of the present invention. Functionally, VT privilege model 90 defines VMX root 92 and VMX non-root 94 operation modes for CPU 12, each further represented by a set of ring-0, 1, 2, 3 privilege levels. VMX non-root 94 is deprivileged relative to VMX root 92, regardless of privilege level, to enable trap support for certain x86 architecture instructions and events that did not conventionally invoke privilege traps. Otherwise, VMX non-root 94 operates as a conventional x86 privilege model. This allows execution of virtual machine monitors $78_{1-N}$ at the ring-0 privilege level of VMX root 92, with full control of platform resources, while guest operating systems $74_{1-N}$ N and application programs provided within application execution spaces $76_{1-N}$ of virtual machines $72_{1-N}$ execute at their intended privilege levels within VMX non-root 94.

Figure 6:
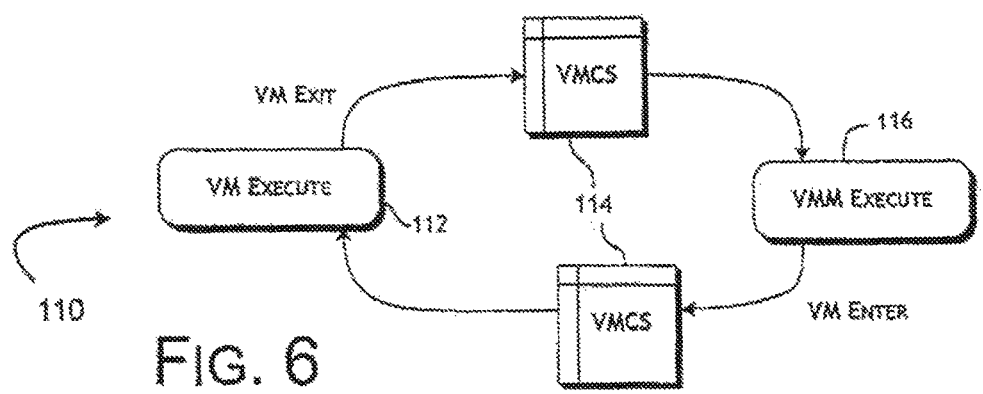
FIG. 6 is a block diagram that illustrates virtual machine exit (VM exit) and virtual machine entry (VM entry) transition paths for a hardware-based virtualization system in accordance with a preferred embodiment of the present invention.

FIG. 6 is a block diagram 110 that illustrates virtual machine exit (VM exit) and virtual machine entry (VM entry) transition paths for a hardware-based virtualization system in accordance with a preferred embodiment of the present invention. Referring to FIG. 6, the function of the VMX root 92 privilege level is to trap otherwise privilege dependent x86 instructions. Many privilege dependent problems are avoided by executing guest operating systems $74_{1-N}$ at the ring-0 level of VMX non-root 94. Then, remaining privilege dependent behaviors are handled by hardware-initiated transitions to virtual machine monitors $78_{1-N}$ executing in the VMX root 92 ring-0 privilege level. In particular, VT provides for privilege traps which force virtual machine exit transitions on the occurrence of privileged register writes, protected memory accesses and system interrupt events. Thus, from nominal VM execution state 112 of one of guest operating systems $74_{1-N}$ within a virtual machine, a hardware-implemented VM exit transition procedure provides for saving the CPU 12 state into virtual machine control structure (VMCS) 114. Included in the CPU 12 saved state is an identification of an instruction or other event that caused invocation of the VM exit transition. Also included in the CPU 12 saved state are other virtual machine state information, such as the contents of descriptor caches for segment registers used by the one of virtual machines $72_{1-N}$. As one can readily appreciate, this effectively enables the corresponding one of virtual machine monitors $78_{1-N}$ to examine the execution context of the corresponding one of guest operating systems $74_{1-N}$ as it exists at the point in time when a VM exit transition occurs.

Virtual machine control structure 114 is also used to store the operating state of the one of virtual machine monitors $78_{1-N}$ while the corresponding one of virtual machines $72_{1-N}$ is executing. Then the one of virtual machine monitors $78_{1-N}$ state is restored to CPU 12 to complete the VM exit transition procedure and allow virtual machine monitor $78_{1-N}$ to begin execution (indicated at 116). The resumed execution enables the one of virtual machine monitors $78_{1-N}$ to inspect and manage, as appropriate, conditions that caused the VM exit transition. For the most common source of VM exit transition, the required virtual machine monitor action is to manage memory space allocations available to the corresponding one of guest operating systems $74_{1-N}$, to initially handle and functionally route interrupts among the different virtual machines $72_{1-N}$, and to manage programmed data transfers through defined I/O ports 26 and mapped I/O addresses 28.

Once a virtual machine monitor $78_{1-N}$ has completed the supervisory tasks required after the VM exit transition, virtual machine monitor $78_{1-N}$ invokes a VM entry transition procedure. The VM entry transition procedure is implemented by storing the current virtual machine monitor $78_{1-N}$ state to virtual machine control structure 114 and restoring the virtual machine state existing in virtual machine control structure 114 to CPU 12. Execution of the corresponding guest operating system $74_{1-N}$ is then resumed.

The inventors recognize that different virtualization techniques for virtualizing a complete computing system present different workload-dependent performance characteristics that reflect different efficiencies in supporting execution of guest operating systems (for example, guest operating systems $74_{1-N}$ shown in FIG. 3). Furthermore, overall performance costs of the different virtualization techniques will also be dependent on the frequency that virtual machine monitors (for example, virtual machine monitors $78_{1-N}$ shown in FIG. 3) are called upon to support virtualization of guest operating systems $74_{1-N}$. That is, dependent in part on the type of guest operating system present in a virtual machine (for example, virtual machines $72_{1-N}$ shown in FIG. 3) and in part on particular applications executed and the level and nature of user requests presented to virtual machines $72_{1-N}$, a qualitative improvement in performance can be achieved by appropriate selection of virtualization technique implemented by virtual machine monitors $78_{1-N}$.

Figure 7A:
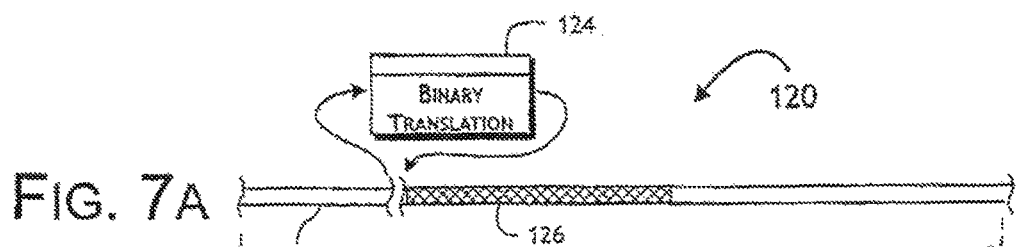
FIGS. 7A and 7B show a diagram that helps illustrate differences between binary translation and VT handling of privilege dependent instruction sequences within an instruction stream.
Figure 7B:
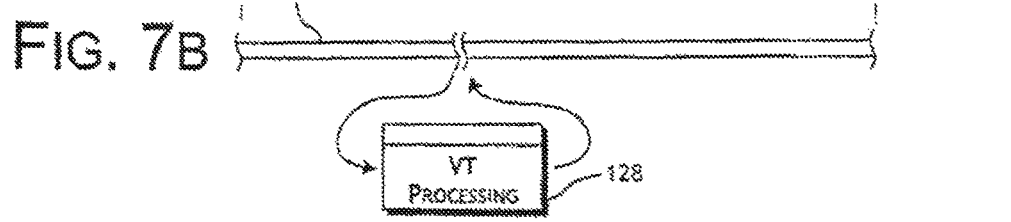

FIGS. 7A and 7B show diagram 120 that helps illustrate differences between binary translation and VT handling of privilege dependent instruction sequences within an instruction stream. As generally indicated in FIG. 7A, for a given portion of a program instruction stream 122, binary translation 124 of sequence 126 containing a privilege dependent instruction incurs distinctive overhead costs from a number of sources. The stereotypical overhead includes binary translation process 124 itself, i.e., the typical execution of additional processor instructions needed to functionally emulate the privilege dependent instruction, and the ongoing cost of monitoring or otherwise managing the selection of the translated code for execution. As comparatively indicated in FIG. 7B for the same program instruction stream 122, VT-based virtualization incurs a different stereotypical overhead. On execution of the privilege dependent instruction, required VT processing 128 incurs the relatively significant overhead of implementing VM exit and subsequent VM entry transitions, and the intervening execution of the exception handler and emulation routines necessary to identify and functionally execute the privilege dependent instruction.

While performance cost of the initial binary translation 124 of translated sequence 126 is significant, a time averaged performance cost can be relatively minor in circumstances where sequence 126 is frequently executed. Conversely, where instruction stream 122 is of sufficiently infrequent execution in the ongoing execution of a virtual machine (for example, one of virtual machines $72_{1-N}$), VT virtualization may be preferred. A performance cost analysis may be used to compare the overhead cost of VM exit and VM entry transitions on each execution of a privilege dependent instruction to the cost of an initial binary translation 124 and the related costs of managing the memory image of translated sequence 126.

As further recognized by the inventors, proper selection of an optimal virtualization technique will vary: (a) as between different virtual machines $72_{1-N}$; (b) depending on time-based loading factors; and (c) depending on the particular nature and context within which particular privilege dependent instructions are encountered. In accordance with a first preferred embodiment of the present invention, performance cost factors are accumulated and analyzed at time-based intervals, on occurrence of well-defined events, or a combination where event instances can be selectively skipped if an event frequency exceeds a time-based threshold. When the analysis is performed, a likely optimal virtualization technique is selected and implemented by a virtual machine monitor (for example, one of virtual machine monitors $78_{1-N}$) for its corresponding virtual machine (for example, the corresponding one of virtual machines $72_{1-N}$).

In accordance with a second preferred embodiment of the present invention, additional performance cost factors are collected to identify the existence of predictable code execution paths of temporally local, overhead-inducing operations encountered in the execution of a guest operating system (for example, one of guest operating systems $74_{1-N}$). As further recognized by the inventors, instruction sequences containing certain patterns of privilege dependent instructions are predictively machine recognizable. Temporally local means that a sequence of privilege dependent instructions, while not necessarily consecutive, occur in an ordered pattern in close proximity to one another relative to virtualization overheads involved. That is, a pattern that contains non-overlapping sub-patterns that, if considered separately, could under differing loading conditions be optimally handled in terms of performance using different virtualization techniques, the sub-patterns are preferably considered temporally separate. Temporal locality thus depends in part on a particular pattern or patterns involved. Similar to the first preferred embodiment, where a pattern is predictively recognized, a cost optimal virtualization technique determined for the pattern is selected and implemented by a virtual machine monitor (for example, one of virtual machine monitors $78_{1-N}$) for its corresponding virtual machine (for example, the corresponding one of virtual machines $72_{1-N}$).

Figure 8:
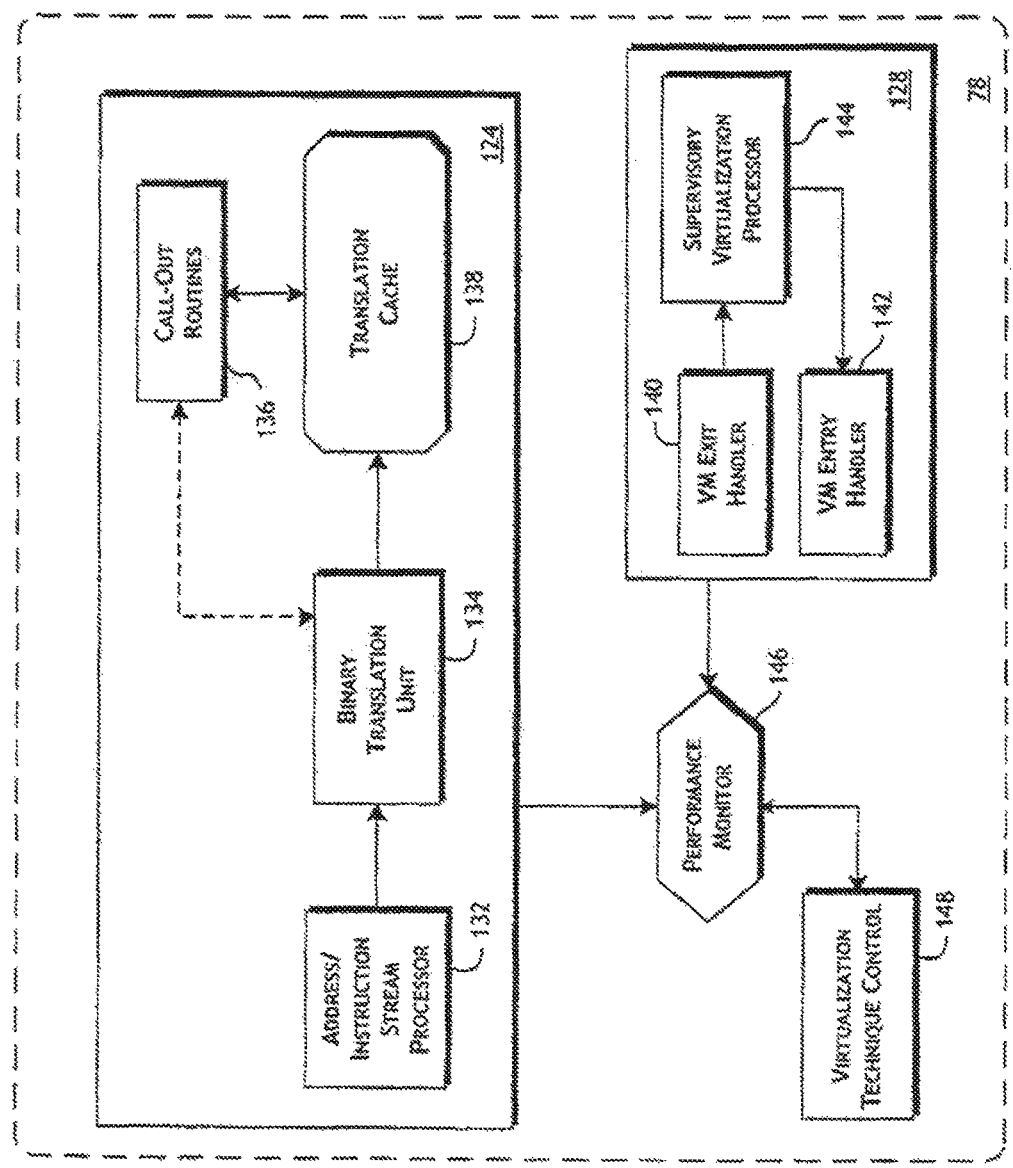
FIG. 8 is a block diagram of major functional components of a virtual machine monitor that implements dynamic selection and application of multiple virtualization techniques, in particular between a binary translation technique and a VT technique, in accordance with one or more embodiments of the present invention.

FIG. 8 is a block diagram of major functional components (i.e., the principal architecture) of virtual machine monitor 78 that implements dynamic selection and application of multiple virtualization techniques, in particular between a binary translation technique and a VT technique, in accordance with one or more preferred embodiments of the present invention. As shown in FIG. 8, virtual machine monitor 78 preferably includes both binary translation component 124 and VT processing component 128. Binary translation component 124 is preferably implemented to support dynamic evaluation and selective binary translation of an instruction stream into a translation cache for subsequent use. Such a binary translation component is described in U.S. Pat. No. 6,704,925 entitled "Dynamic Binary Translator with a System and Method for Updating and Maintaining Coherency of a Translation Cache," issued to Bugnion and assigned to the assignee of the present invention, which patent is hereby incorporated by reference.

Binary translation component 124 comprises address/instruction stream processor 132 that receives an instruction stream shortly before execution by CPU 12. Binary translation unit 134 examines incremental sections of the instruction stream to decode and identify the occurrence of privilege dependent instructions. Where found, the local instruction stream is further analyzed, and functionally modified to implement the intended instructions in a de-privileged execution manner. Preferably, such modifications are implemented by re-writing the instruction stream to implement the intended function without involving a privilege exception. The instruction stream re-write can involve direct substitution of an alternate series of instructions that directly perform the desired function, insertion of appropriate jump instructions to invoke one or more pre-established library call-out routines 136 to accomplish the desired function, or a combination of both translation techniques. The resulting translated instruction stream, further incorporating appropriate relative branch target modifications, is then stored in translation cache 138. The original instruction stream is left unmodified. Execution of the guest operating system (for example, one of guest operating system $74_{1-N}$) is monitored with the effect that whenever the unmodified original instruction stream would otherwise be fetched for execution, the translated instruction stream is fetched and executed instead.

VT processing component 128 preferably incorporates VM exit handler 140, VM entry handler 142, and supervisory virtualization processor 144. The function and operation of VM exit handler 140 and VM entry handler 142 are documented in, for example, the Intel® Virtualization Technology for Directed I/O Architecture Specification, February 2006, Intel Corporation, Order Number D51397-001, Intel® Virtualization Technology Specification for the IA-32 Intel® Architecture, April 2005, Intel Corporation, Order Number C97063-002, and Intel® Virtualization Technology Specification for the Intel® Itanium® Architecture (VT-I), Revision 2.0, April 2005, Intel Corporation, Document Number 305942-002. In summary, VM exit handler 140 and VM entry handler 142 are responsible for managing virtual machine control structure 114 (refer to FIG. 6) and for reading the exit and programming the entry contexts of the virtual machine (for example, one of virtual machines $72_{1-N}$) as appropriate to support emulation of a particular privilege dependent instruction encountered. Supervisory virtualization processor 144 operates to identify both the privilege dependent instruction that triggered a VM exit and the relevant details of the guest operating system (for example, one of guest operating systems $74_{1-N}$) context under which execution of the instruction was initiated. In preferred embodiments of the present invention, supervisory virtualization processor 144 preferably implements this analysis in a manner similar to binary translation unit 134. That is, once the instruction and context are identified, supervisory virtualization processor 144 preferably determines and calls library routines similar to, if not the same as, the library call-out routines 136 as appropriate to functionally implement the privilege dependent instruction.

Performance monitor 146 shown in FIG. 8, preferably represents an instrumentation of the virtual machine monitor (for example, one of virtual machine monitors $78_{1-N}$) to collect, total and summarize ongoing performance of the virtual machine monitor in providing virtualization support to its associated virtual machine. While the detailed points of instrumentation will differ based on the specific implementation of the virtual machine monitor, the instrumentation preferably functions, relative to the first preferred embodiment of the present invention, to measure, over intervals, the time and resource costs incurred in, for example, retrieving program stream instructions for translation, the time used in performing translation and the size and relative use of the translation cache, and the relative increase in execution time required in executing the translated instruction stream. The instrumentation also preferably considers the time cost of performing VM exit and entry transitions, which may be pre-calculated or directly measured, and the time and resources required by supervisory virtualization processor 144 to examine and emulate individual privilege dependent instructions. For the second preferred embodiment of the present invention, as will be described in greater detail below, the identity, relative location, and frequency of the different privilege dependent instructions encountered are also collected. For all embodiments, the frequency that any portion of the instruction stream is repeatedly encountered is also recognized and recorded by the performance monitor 146.

Virtualization technique control component 148 interoperates with performance monitor 146 to identify an optimal virtualization technique for the specific operating circumstances of the associated virtual machine and, as necessary, correspondingly change the privilege model implemented by the virtual machine. For the first preferred embodiment of the present invention, the choice of optimal virtualization technique is reconsidered at intervals, whether defined by time, event occurrences, or possibly whenever a quantified measurement of instrumentation data has been collected. A switch between virtualization techniques is implemented upon recognition that the expected performance gain to be realized by switching will exceed a defined threshold value. This threshold value may be empirically determined to maximize overall performance gain, and may be subject to adjustment by virtualization technique control component 148.

For the first preferred embodiment of the present invention, the actual computation of the optimal virtualization technique is preferably determined from the relative difference in: (a) an actual, instrumentation determined, performance overhead incurred by the currently employed virtualization technique; and (b) an estimated performance overhead that would be incurred by other virtualization techniques in executing the same instruction stream over the same interval. The computation preferably also includes an estimated performance cost to switch between the current and estimated virtualization technique. Where a net improvement in performance is determined, preferably above the empirically determined threshold, virtualization technique control 148 switches the virtualization technique implemented by the virtual machine monitor to the virtualization technique determined to have the highest net performance improvement. Preferably, the instrumentation of virtual machine monitor 78 also monitors the rate of change in the selected virtualization technique as a control against overall performance loss due to excessive or too fast switching of virtualization techniques.

Figure 9:
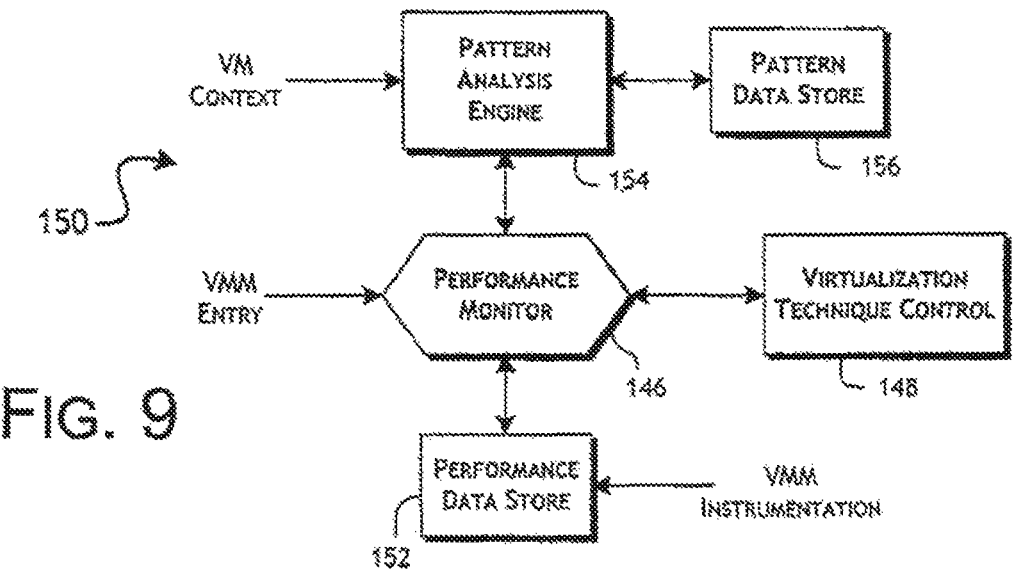
FIG. 9 is a block diagram detailing operation of a performance monitor in accordance with one or more embodiments of the present invention.

For the second preferred embodiment of the present invention, virtualization technique control component 148 selects an optimal virtualization technique based on identification of a current hot execution path. FIG. 9 is a block diagram detailing operation of performance monitor 146 in accordance with one or more embodiments of the present invention. As shown in diagrammatic representation 150 of FIG. 9, performance monitor 146 includes performance data store 152 that continuously receives and stores instrumentation data collected from the virtual machine monitor (for example, one of virtual machine monitors $78_{1-N}$). At least for the second preferred embodiment of the present invention, performance monitor 146 also includes pattern analysis engine 154 and pattern data store 156, which components are used by performance monitor 146 to recognize, by temporally localized pattern, the start of a current hot execution path. Preferably, a number of well-known or expected patterns are pre-stored to pattern data store 156. Through ongoing operation of performance monitor 146 and pattern analysis engine 154, principally based on the relative timing of occurrence and relative location, additional hot execution path patterns are dynamically recognized and stored to pattern data store 156. That is, pattern analysis engine 154 preferably operates to recognize repeated virtualization operation occurrences due to specifically identified instructions that are temporally local, based on the trapped instruction address determinable from the virtual machine context, and repeatedly encountered in consistent order.

Virtualization technique control component 148 also interoperates with performance monitor 146 of the second preferred embodiment to evaluate alternate virtualization techniques. The preferred virtualization technique for a particular hot execution path is determined by summing performance overheads for virtualization operations that will be performed through the hot execution path, and selecting the virtualization technique with the lowest path-dependent total overhead. For well-known hot execution paths, the performance computation may be performed and stored to pattern data store 156 in advance of even the execution of the virtual machine (for example, one of virtual machines $72_{1-N}$). For newly discovered patterns and variants of well-known patterns, the computation is preferably performed once the pattern is identified by pattern analysis engine 154. The pattern and the preferred virtualization technique are then preferably stored to pattern data store 156 for subsequent reference.

Virtualization technique choices for the hot execution paths are preferably dynamically reevaluated and, as appropriate, changed. Various conditions may result in changes in the relative costs of different virtualization techniques relative to specific hot execution paths. These conditions include changes in TLB and cache hit ratios, and changes in instrumentation implemented by the virtual machine monitor against its corresponding guest operating system. On reevaluation of a hot execution path, chosen using for example a random sampling technique, the measured overhead cost can be averaged with the existing cost value stored in pattern data store 156. The choice of virtualization technique for the corresponding hot execution path may then be changed dependent on the revised cost.

Figures 10A, 10B, 10C:
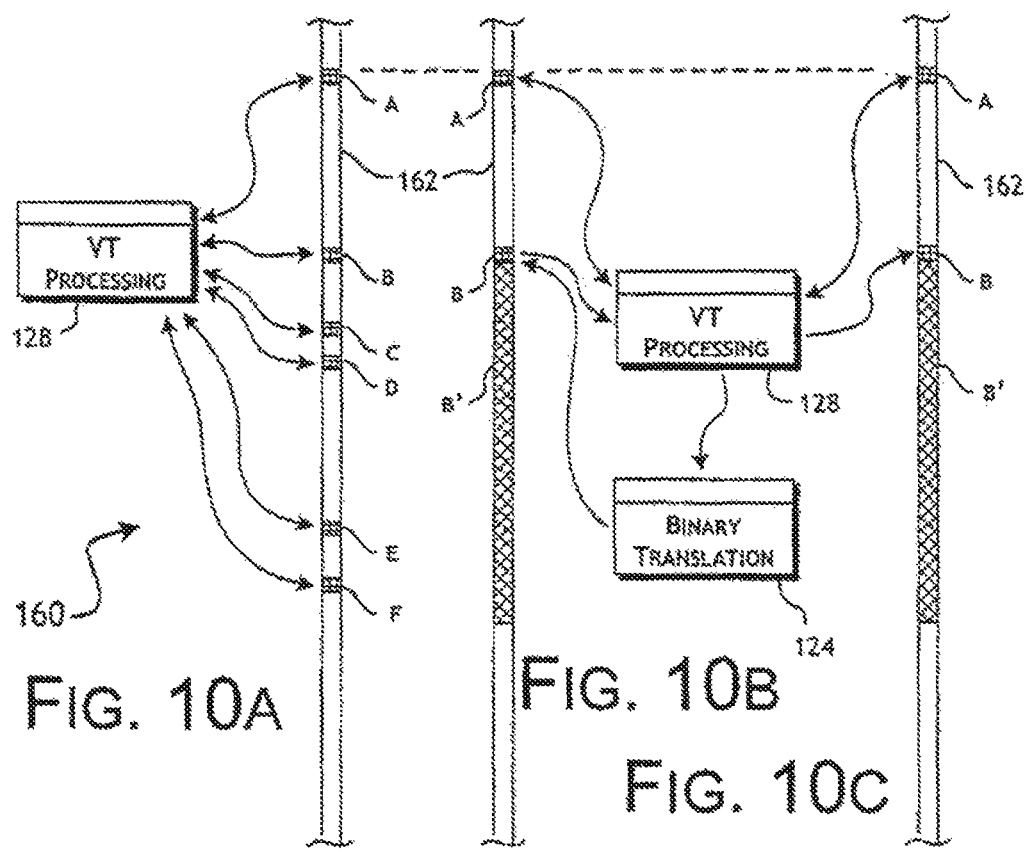
FIGS. 10A, 10B and 10C present a diagrammatic representation of the application of multiple virtualization techniques, in particular binary translation and VT, to otherwise privilege dependent instruction sequences within an instruction stream in accordance with one or more embodiments of the present invention.

Diagrammatic representation 160 shown in FIGS. 10A, 10B and 10C illustrates the application of multiple virtualization techniques, in particular binary translation and VT virtualization techniques, to otherwise privilege dependent instruction sequences within an instruction stream in accordance with a preferred embodiment of the present invention. For purposes of this example, VT virtualization is preferably established as a default and initially current virtualization technique. As shown in FIG. 10A, a portion of instruction stream 162 is shown in which a set of virtualization operations (A, B, C, D, E, F) occur, each set representing a location of a privilege dependent instruction. As shown in FIG. 10A, each occurrence of virtualization operations is handled discretely by VT processing component 128. Thus, if instruction stream 162 is frequently encountered in the execution of the corresponding guest operating system (for example, one of guest operating systems $74_{1-N}$), a substantial performance cost is incurred by frequent VM exit and VM entry transitions. Referring to FIG. 10B and considering the second preferred embodiment of the present invention, sufficient performance data is collected to support recognition of a pattern starting with the virtualization operation (B). The virtualization operation at (A) may not be recognized as part of the pattern because the virtualization operation is too distant temporally from following virtualization operations or may not reliably occur, so as not to be predictive of a pattern. Thus, the virtualization operation at (A) is preferably handled discretely as before by VT processing component 128.

As shown in FIG. 10B, a virtualization operation at (B) is initially trapped by VT processing component 128. However, execution of performance monitor 146 and virtualization technique control 148 (referring to FIG. 9) within the virtual machine monitor (for example, one of virtual machine monitors $78_{1-N}$) following entry in response to the virtualization operation (B) VM exit transition (referring to FIG. 6) results in selection of a binary translation virtualization technique for further processing of instruction stream 162, preferably including the virtualization operation at (B). To do this, the privilege model is switched, and binary translation component 124 is invoked to process instruction stream 162 to functionally translate (B') the virtualization operations (B, C, D, E, F).

As shown in FIG. 10C, on subsequent executions of instruction stream 162, binary translation (B') of instruction stream 162 is nominally available for execution immediately from translation cache 138 (referring to FIG. 8). Recognition of the pattern initiated by virtualization operation (B) preferably results in an immediate virtualization switch to binary translation, and execution of the translated portion (B') of instruction stream 162. Consequently, with the pre-calculated preference for binary translation for the pattern started by the virtualization operation at (B), only a minimum performance cost of switching virtualization techniques is incurred to maximize the potential execution performance of the given portion of instruction stream 162.

Referring again to FIG. 10B, several different considerations are involved in determining when and how to return from an elected binary translation virtualization technique to the default VT virtualization technique. In recognizing a hot execution path pattern starting at (B), pattern analysis engine 154 (referring to FIG. 9) may also recognize a definite pattern ending virtualization operation at (F). Thus, the end portion of the binary translated patch (B') may simply incorporate instructions necessary to switch to the default VT virtualization technique. Alternately, as part of generating the binary translated code, binary translation unit 134 (referring to FIG. 8) will ensure that an appropriate library call routine 136 (referring to FIG. 8) is called from the generated code to cause a rate appropriate execution of performance monitor 146 and virtualization technique control component 148 (referring to FIG. 9). When no further temporally local virtualization operations are evident, virtualization technique control component 148 will preferably initiate a switch back to the default, VT virtualization technique. Another alternative, or in addition, when binary translator component 124 recognizes the imminent execution of a return from an interrupt (IRET) instruction, virtualization technique control component 148 will initiate a switch to a VT virtualization technique, and enable the return through execution of a VM entry transition.

Figure 11:
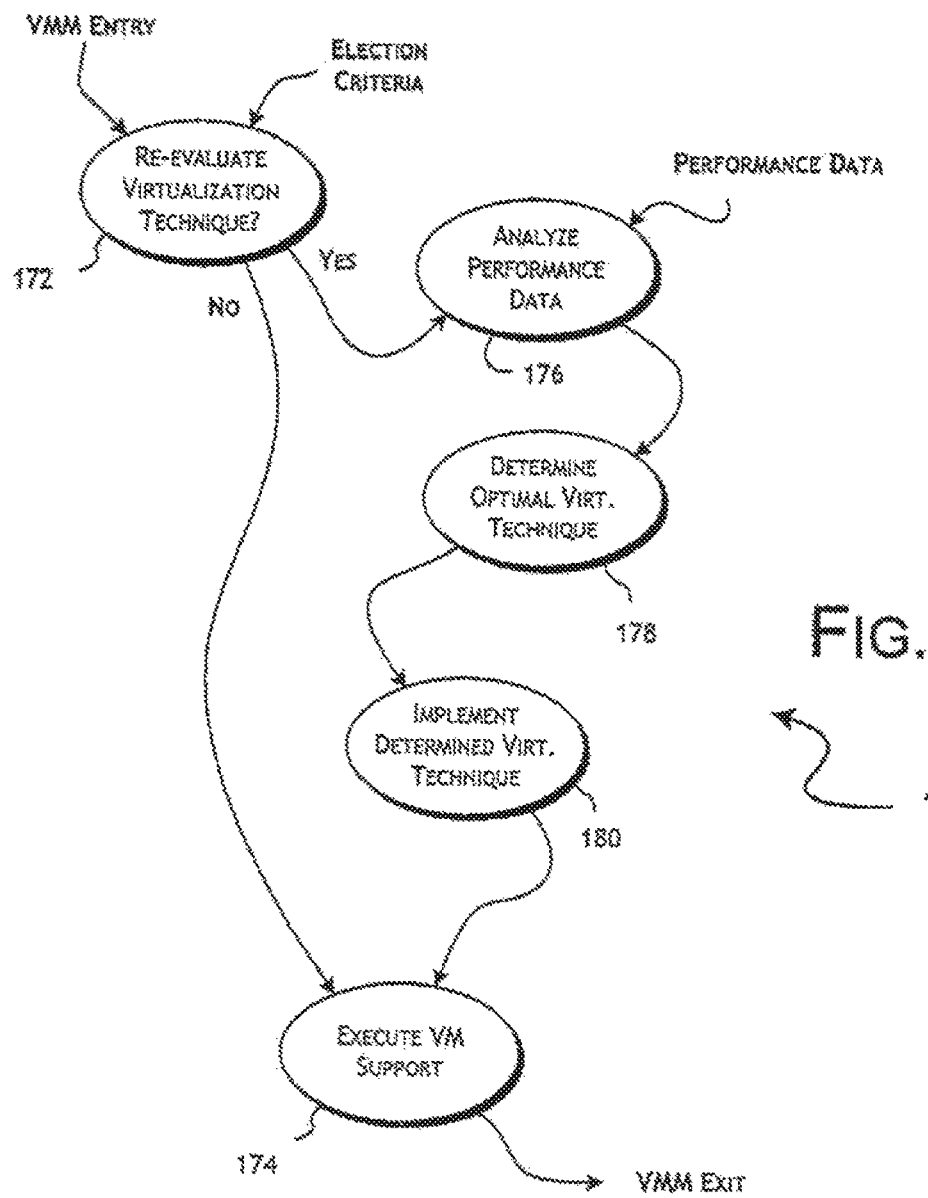
FIG. 11 is a flow diagram illustrating a first preferred embodiment of the present invention in performing dynamic, block oriented, selection and application of multiple virtualization techniques.

FIG. 11 shows flow diagram 170 which illustrates a first preferred embodiment of the present invention for performing dynamic, block oriented, selection and application of multiple virtualization techniques. For this embodiment, on any entry into the virtual machine monitor (for example, one of virtual machine monitors $78_{1-N}$), at decision step 172, performance monitor 146 will first determine whether to reconsider use of the current virtualization technique. The election criterion upon which a reconsideration is evaluated can be simply whether a sufficient interval of time has elapsed since the last evaluation was performed. Another possible criterion is whether the quantitative amount of performance data collected since the last evaluation is sufficient to warrant a reconsideration. Other criteria can include the rate at which reconsiderations are requested relative to portions of time that the virtual machine spends in executing the guest operating system and guest application programs (for example, one of guest operating systems $74_{1-N}$ and its corresponding guest application programs). Where the reconsideration criteria are not met, execution of the virtual machine monitor continues at step 174 as necessary to support any outstanding virtual operation. On completion of the emulation, execution of the virtual machine monitor is exited.

Where the reconsideration criteria are met, control is transferred to step 176 where performance monitor 146 and virtualization technique control component 148 interoperate to analyze the performance data 176, and at step 178, determine an optimal or preferred virtualization technique. At step 180, virtualization technique control component 148 then implements the chosen virtualization technique by, as necessary, adjusting the privilege model and enabling the appropriate virtualization operation controls within the virtual machine monitor. Control is transferred to step 174 where the virtual machine monitor then executes the appropriate support routines to implement the functional requirements of any outstanding virtual operation. On completion of the emulation, execution of the virtual machine monitor is exited.

Figure 12:
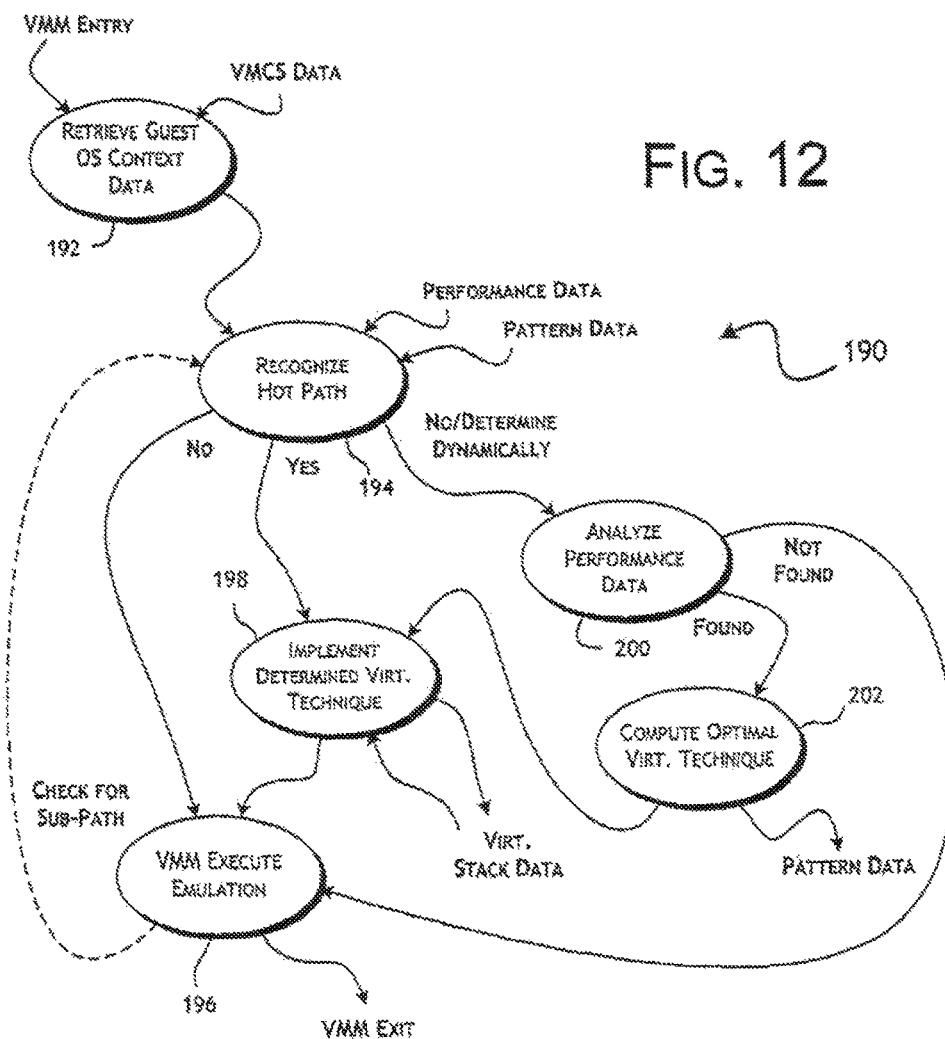
FIG. 12 is a flow diagram illustrating a second preferred embodiment of the present invention in performing dynamic, hot-path oriented, selection and application of multiple virtualization techniques.

FIG. 12 shows flow diagram 190 which illustrates a second preferred embodiment of the present invention for performing dynamic, hot-path oriented, selection and application of multiple virtualization techniques. For this embodiment, on each entry into the virtual machine monitor (for example, one of virtual machine monitors $78_{1-N}$), at step 192, a potential for switching virtualization techniques is considered relative to a program stream expected to be executed. The virtual machine context data for the guest operating system is retrieved from the virtual machine control structure, and control is transferred to decision step 194. At decision step 194, the information presented in the virtual machine control structure is examined. In particular, the address location and instruction are identified and used by pattern analysis engine 154 to determine if the trap initiating instruction represents the start of a recognized hot execution path. If unrecognized and the virtual address location is not temporally close to any prior recorded performance data, control is transferred to step 196 where the virtual machine monitor performs the appropriate emulation of the trapped instruction, consistent with the currently active virtualization technique. At decision step 194, where pattern analysis engine 154 recognizes a hot execution path, control is transferred to step 198. At step 198, the corresponding preferred virtualization technique is applied, and control is transferred to step 196 where emulation of the trapped instruction is performed.

In accordance with one or more such embodiments of the present invention, the potential for sub-paths or nested hot execution paths is monitored by recursively checking for the recognition of hot execution paths as each privilege dependent instruction is encountered in the emulation operation of the virtual machine monitor at step 196. A sub-path, for purposes of one or more embodiments of the present invention, is defined otherwise as a hot execution path nested within a continuing hot execution path where the nested path is optimally performed using a virtualization technique different from that of the immediate outer hot execution path. A virtualization stack is preferably maintained to track transitions between nested hot execution paths and the stacked sequence of outer host execution paths. That is, at step 198, as sub-paths are encountered and subsequently reach defined ends, an outer hot execution path virtualization technique identifier is pushed and popped from the virtualization stack to manage selection of the current implemented virtualization technique.

Finally, at decision step 194, where a hot execution path is not recognized, but such a path may potentially exist based on existing performance and pattern data, control is transferred to decision step 200 where the current set of performance data is analyzed. If a hot execution path pattern is not identified, control is transferred to step 196 where the emulation of the trapped instruction is performed using the existing virtualization technique. Where a new pattern is dynamically identified, control is transferred to step 202 where the optimal virtualization technique is computed, and both the pattern and determined optimal virtualization technique are stored as pattern data in pattern data store 156 (referring to FIG. 9) and control is transferred to step 198. At step 198, the newly identified virtualization technique is applied, and control is transferred to step 196. At step 196, emulation of the trapped instruction is performed. On completion of the emulation, including any sub-paths, execution of the virtual machine monitor is exited.

FIG. 13 shows flow diagram 209 which illustrates a preferred embodiment of a method for implementing dynamic transition between multiple virtualization techniques in accordance with the present invention. For one such preferred embodiment, binary translation and VT virtualization techniques are implemented in the virtual machine monitor (for example, one of virtual machine monitors $78_{1-N}$). At step 198 (also referring to FIG. 12), on determining to switch an active virtualization technique to a target virtualization technique, if a binary translation is selected control is transferred to step 210, otherwise, if a VT virtualization technique is selected control is transferred to step 212. For binary translation, at step 214, VT processing component 128 is disabled and binary translation component 124 is enabled (referring to FIG. 8). At step 216, the VMX privilege bit of the processor status register is reset, and the privilege bits maintained in the segment registers associated with the virtual machine monitor (for example, one of virtual machine monitors $78_{1-N}$) and its corresponding guest operating system (for example, one of guest operating systems $74_{1-N}$) are modified to establish the standard binary translation ring-0, 1, 3 privilege model 80 (referring to FIG. 4A) for execution of the corresponding virtual machine (for example, one of virtual machine $72_{1-N}$).

Where VT virtualization is to be activated, at step 218, operation of binary translation component 124 is suspended. In particular, the contents of translation cache 138 and shadow page tables 106 are maintained. Then, operation of VT processing component 128 is enabled. At step 220, the VMX privilege bit of the processor status register is set, and the privilege bits maintained in the segment registers associated with the virtual machine monitor and its corresponding guest operating system are modified to establish the standard VMX non-root ring-0, 3 privilege model 90 (referring to FIG. 4A) for execution of the corresponding virtual machine.

In switching between virtualization techniques, the current virtual machine state for the chosen virtualization technique could be determined by review of the various on-CPU registers and in-memory data structures of the respective guest operating systems $74_{1-N}$. Preferably, virtualization technique control component 148 provides for a conversion between the virtual machine state representations used by the different virtualization techniques. In particular, virtualization technique control component 148 provides for conversion between the various in-memory data structures optimally used for binary translation virtualization, and the hardware-dependent data structures required to support VT virtualization. Preferably, virtualization state descriptions of the general and segment registers, interrupt state, shadowed portions of the segment registers, control register and other aspects of the CPU state are transferred. For a preferred embodiment of the present invention, the virtual machine state is maintained in the binary translation virtualization data structures and updated subject to transformation to the VT virtualization data structures as needed.

Thus, an autonomous system and methods of providing dynamic optimizing of the realized execution performance of virtual machines have been described. While embodiments of the present invention have been described particularly with reference to the Intel-based VT virtualization technology, further embodiments of the present invention are equally applicable to other hardware-based virtualization technologies and to the use of and selection between multiple different software and hardware virtualization technologies within a virtual machine monitor.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

What is claimed is:

1. A method of selecting a virtualization support subsystem for a virtual computing instance executed in a virtualized computer system, the method comprising:
   determining an actual performance overhead incurred by a first virtualization support subsystem running on a first computer while supporting the virtual computing instance during execution of an instruction stream;
   determining an estimated performance overhead that would be incurred by a second virtualization support subsystem upon running on the first computer while supporting the virtual computing instance during execution of the same instruction stream; and
   selecting the first or the second virtualization support subsystem for the virtual computing instance based on the actual performance overhead and the estimated performance overhead.

2. The method of claim 1, further comprising:
   determining an estimated performance cost to switch between the virtualization support subsystems, wherein the second virtualization support subsystem is selected for the virtual computing instance if a total of the estimated performance cost to switch and the estimated performance overhead is less than the actual performance overhead by a predetermined threshold.

3. The method of claim 1, wherein the instruction stream includes a privilege-dependent instruction that raises an exception.

4. The method of claim 3, wherein the first and second virtualization support subsystems handles the exception differently.

5. The method of claim 4, wherein data for determining the actual performance overhead and data for determining the estimated performance overhead are collected during a time period beginning upon start of exception handling and ending upon completion of the exception handling.

6. The method of claim 5, wherein data for determining performance overhead includes a number of instruction cycles used to carry out the exception handling.

7. The method of claim 1, wherein the actual and estimated performance overheads are determined and the virtualization support subsystem is selected based thereon, at time-based intervals, on occurrence of well-defined events, or a combination.

8. The method of claim 1, wherein the virtual computing instance is a virtual machine.

9. A non-transitory computer-readable medium comprising instructions to be executed in a computer system that supports execution of a virtual computing instance using one of a plurality of virtualization support subsystems, wherein the instructions cause the computer system to select a virtualization support subsystem for the virtual computing instance by:
   determining an actual performance overhead incurred by a first virtualization support subsystem running on the first computer, wherein the first virtualization support subsystem is supporting the virtual computing instance during execution of an instruction stream;
   determining an estimated performance overhead that would have been incurred by a second virtualization support subsystem upon running on the first computer while supporting the virtual computing instance during execution of the same instruction stream; and
   selecting the first or the second virtualization support subsystem for the virtual computing instance based on the actual performance overhead and the estimated performance overhead.

10. The non-transitory computer-readable medium of claim 9, wherein the method further comprises:
    determining an estimated performance cost to switch between the virtualization support subsystems, wherein the second virtualization support subsystem is selected for the virtual computing instance if a total of the estimated performance cost to switch and the estimated performance overhead is less than the actual performance overhead by a predetermined threshold.

11. The non-transitory computer-readable medium of claim 9, wherein the instruction stream includes a privilege-dependent instruction that raises an exception.

12. The non-transitory computer-readable medium of claim 11, wherein the first and second virtualization support subsystems handles the exception differently.

13. The non-transitory computer-readable medium of claim 12, wherein data for determining the actual performance overhead and data for determining the estimated performance overhead are collected during a time period beginning upon start of exception handling and ending upon completion of the exception handling.

14. The non-transitory computer-readable medium of claim 13, wherein data for determining performance overhead includes a number of instruction cycles used to carry out the exception handling.

15. The non-transitory computer-readable medium of claim 9, wherein the actual and estimated performance overheads are determined and the virtualization support subsystem is selected based thereon, at time-based intervals, on occurrence of well-defined events, or a combination.

16. A computer system comprising:
    a hardware platform, including a processor and memory which has stored therein instructions executable by the processor, wherein the instructions cause the processor system to select a virtualization support subsystem for a virtual computing instance by:
    determining an actual performance overhead incurred by a first virtualization support subsystem running on the first computer, wherein the first virtualization support subsystem is supporting the virtual computing instance during execution of an instruction stream;
    determining an estimated performance overhead that would have been incurred by a second virtualization support subsystem upon running on the first computer while supporting the virtual computing instance during execution of the same instruction stream; and
    selecting the first or the second virtualization support subsystem for the virtual computing instance based on the actual performance overhead and the estimated performance overhead.

17. The computer system of claim 16, wherein
    an estimated performance cost to switch between the virtualization support subsystems is determined, and
    the second virtualization support subsystem is selected for the virtual computing instance if a total of the estimated performance cost to switch and the estimated performance overhead is less than the actual performance overhead by a predetermined threshold.

18. The computer system of claim 16, wherein the instruction stream includes a privilege-dependent instruction that raises an exception, and the first and second virtualization support subsystems handles the exception differently.

19. The computer system of claim 18, wherein data for determining the actual performance overhead and data for determining the estimated performance overhead are collected during a time period beginning upon start of exception handling and ending upon completion of the exception handling, and data for determining the actual or estimated performance overhead includes a number of instruction cycles used to carry out the exception handling.

20. The computer system of claim 16, wherein the actual and estimated performance overheads are determined and the virtualization support subsystem is selected based thereon, at time-based intervals, on occurrence of well-defined events, or a combination.

* * * * *